United States Patent
Landrum et al.

(10) Patent No.: US 10,144,334 B2
(45) Date of Patent: Dec. 4, 2018

(54) LASHING SECUREMENT PIN

(71) Applicants: Scott C. Landrum, Southlake, TX (US); James H. Jones, III, Arlington, TX (US); Dale G. Schultz, Cleburne, TX (US)

(72) Inventors: Scott C. Landrum, Southlake, TX (US); James H. Jones, III, Arlington, TX (US); Dale G. Schultz, Cleburne, TX (US)

(73) Assignee: BNSF Logistics, LLC, Springdale, AR (US)

( * ) Notice: Subject to any disclaimer, the term of this patent is extended or adjusted under 35 U.S.C. 154(b) by 26 days.

(21) Appl. No.: 15/433,313

(22) Filed: Feb. 15, 2017

(65) Prior Publication Data

US 2018/0229640 A1 Aug. 16, 2018

(51) Int. Cl.
*B60P 7/08* (2006.01)
*F16B 13/04* (2006.01)
*F16B 13/10* (2006.01)

(52) U.S. Cl.
CPC ......... *B60P 7/0807* (2013.01); *B60P 7/0823* (2013.01); *F16B 13/04* (2013.01); *F16B 2013/10* (2013.01); *Y10T 24/42* (2015.01)

(58) Field of Classification Search
CPC ...... B60P 7/0807; Y10T 24/28; Y10T 24/453; Y10T 24/42; F16B 21/02
See application file for complete search history.

(56) References Cited

U.S. PATENT DOCUMENTS

| | | | | |
|---|---|---|---|---|
| 3,145,441 A * | 8/1964 | Strandrud | ............. | F16B 19/109 411/347 |
| 3,956,803 A * | 5/1976 | Leitner | ................... | F16B 19/02 411/349 |
| 4,372,015 A * | 2/1983 | Rhoton | .................. | F16B 5/025 24/453 |
| 4,789,287 A * | 12/1988 | Le | .......................... | F16B 5/025 411/107 |
| 5,607,271 A * | 3/1997 | Salice | ....................... | E05D 5/08 411/273 |
| 2005/0084361 A1* | 4/2005 | Fly | .......................... | B25B 5/08 411/107 |

\* cited by examiner

*Primary Examiner* — Robert Sandy
*Assistant Examiner* — Michael S Lee
(74) *Attorney, Agent, or Firm* — Dan Brown Law Office; Daniel R. Brown

(57) ABSTRACT

A lashing pin for engaging a hole in member to facilitate lashing the member to a fixture or vehicle. The lashing pin combines a cam pin sleeve assembly having a flange and sleeve with an eccentric hole formed therethrough with a cam pin assembly having a cam pin passing through the eccentric hole and connecting a cam disk with an eccentrically mounted cam. Rotation of the cam disk with respect to the flange aligns and misaligned the cam with respect to the cam sleeve, thereby enabling insertion through the hole at first position, and retention of the cam against removal at a second position.

12 Claims, 5 Drawing Sheets

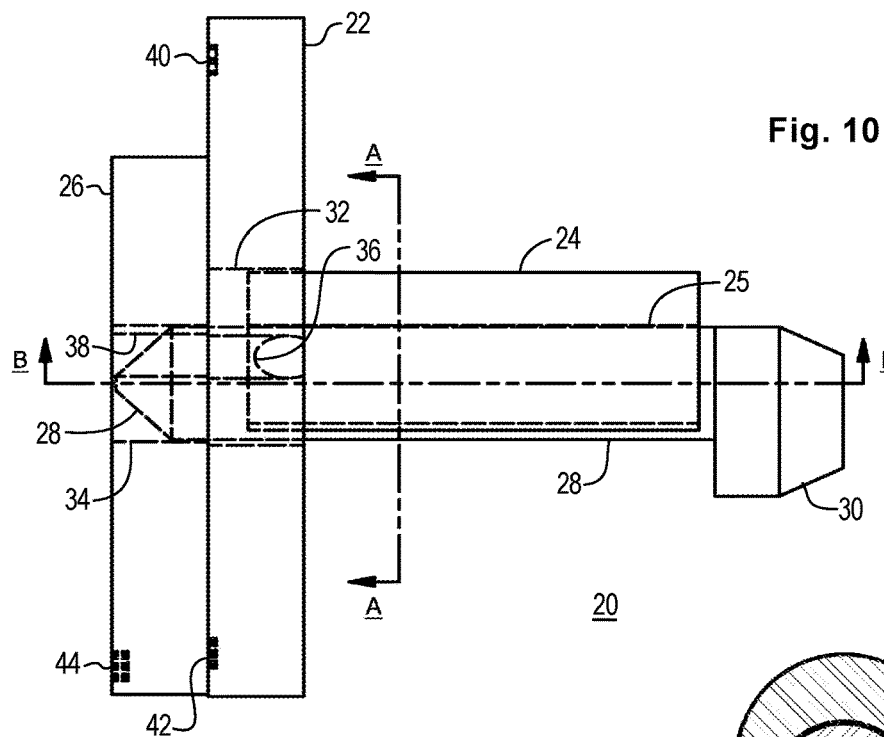
Fig. 10
Fig. 11
Section A-A
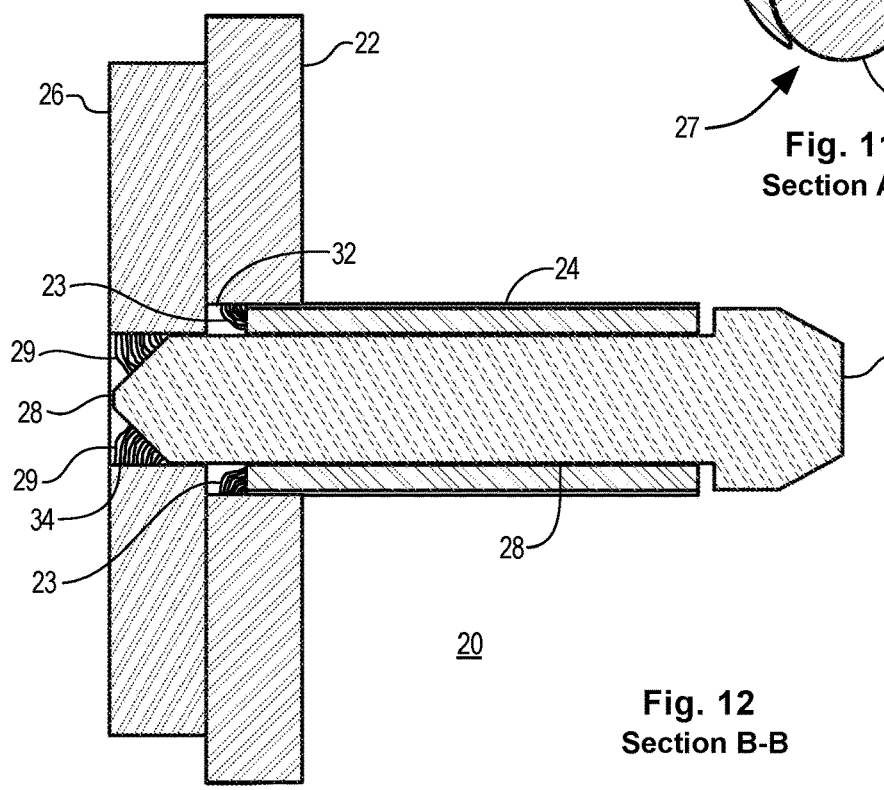
Fig. 12
Section B-B

LASHING SECUREMENT PIN

BACKGROUND OF THE INVENTION

Related Applications

None.

Field of the Invention

The present invention relates to securing loads for transportation using lashing lines. More particularly, the present invention relates to a lashing pin that is retained in a hole of a member by a cam, which is useful in lashing wind turbine tower sections to railcars by engaging a bolt hole in a flange.

Description of the Related Art

The prior art processes for securing wind turbine tower sections to railcars included bolting tie down plates to the flanges at each end of a tower section using a bolt, washer, and nut set. The tie down plates serve as a connection points that are lashed to the railcar using lashing lines. This is necessary to prevent the tower section from rolling off the railcar, or railcar fixture, during transport. Similar lashing techniques are employed for a wide range of cargo carried on a wide range of vehicles and loading fixtures, as are known to those skilled in the art.

FIG. 1 is a prior art drawing of a wind turbine tower section 4 lashed to a railroad flatcar 2. The tower section 4 has a flange 6 at the end, which has many bolt holes 8 formed there through. In this illustration, two tie down plates 12 are bolted to the flange 6 (bolt, washer, nut not illustrated). Lashing lines 10 are connected between the tide down plates 12 and lashing rings 14 that are fixed to the railcar 2. The lashing lines may be chain, cable, rope, or other suitable line material. The lashing lines 10 are tightened to secure the tower section 4. The tower section 4 may also be secured using a suitable foot stop 18 and mounting bracket 16, as are known to those skilled in the art.

The prior art bolted flange plate assemblies are quite large. Furthermore, the fastening points are typically located high on the railcar, making the attachment process awkward. Additionally, tower ends are normally covered with protective tarpaulins, which interfere with access for connecting the bolt sets. This requires provisions for gaining access to the flange holes on the tower section, which is time consuming and may damage the tarpaulins. Thus it can be appreciated that there is a need in the art for improved systems and methods for lashing loads to carriage vehicles and fixtures.

SUMMARY OF THE INVENTION

The need in the art is addressed by the apparatus and methods of the present invention. An illustrative embodiment of the present disclosure teaches a lashing pin apparatus that retainably engages a hole formed through a member, such as an item of freight that is carried on a fixture or vehicle. The apparatus includes a cam pin sleeve that has a flange at a proximal end thereof, and has a cam pin hole formed eccentrically therethrough from the flange to a distal end thereof. It also includes a cam pin assembly that has a cam pin fixed between a cam disk at a proximal end and a cam eccentrically connected at a distal end thereof. The cam pin rotatably engages the cam pin hole and is aligned such that the cam disk is located adjacent the flange and the cam is located adjacent to the distal end of the sleeve. Rotation of the cam disk with respect to the flange goes to an unlocked position that aligns the cam with the sleeve to facilitate insertion though the hole in the member, and, rotation of the cam disk also goes to a locked position that misaligns the cam with respect to the sleeve such that the cam engages the member against removal through the hole in the member.

In a specific embodiment, the foregoing apparatus further includes an operator connected to the cam disk to facilitate manual rotation of the cam disk. In a refinement to this embodiment, the operator is a lashing ring, and a metal clip is fixed to the cam disk through which the lashing ring swivels.

In a specific embodiment, the foregoing apparatus further includes an orientation mark disposed upon the flange to indicate a preferred orientation during manual insertion of the lashing pin apparatus through the hole in the member.

In a specific embodiment, the foregoing apparatus further includes an engagement indicator that is disposed on a proximate surface of the lashing pin apparatus, which is revealed while the cam disk is located at the locked position, and which provides an indication that the cam is misaligned with the sleeve and retained against removal through the hole in the member.

In a specific embodiment, the foregoing apparatus further includes an non-engagement indicator that is disposed on a proximate surface of the lashing pin apparatus, which is revealed while the cam disk is located at the unlocked position, to thereby provide an indication that the cam is aligned with the sleeve and enabled for insertion or removal through the hole in the member.

In a specific embodiment, the foregoing apparatus further includes a first hole formed through the flange and a second hole formed through the cam disk, and wherein the first hole and the second hole are aligned while the cam disk is located at the locked position. This alignment facilitates insertion of an anti-rotation member through both of the first hole and the second hole, which thereby prevents rotation of the cam disk away from the locked position. The anti-rotation member may be a lock, a cable, a chain, a rod, or other member suitable to prevent rotation.

An illustrative embodiment of present disclosure teaches a lashing pin apparatus that retainably engages a hole formed through a member, such as an item of freight that is carried on a fixture or vehicle. The apparatus includes a cam pin sleeve with a flange at a proximal end thereof, and a cam pin hole formed eccentrically therethrough from the flange to a distal end thereof. The apparatus also includes a cam pin assembly that has a cam pin fixed between a cam disk at a proximal end and a cam eccentrically connected at a distal end thereof. The cam pin rotatably engages the cam pin hole and is aligned such that the cam disk is located adjacent to the flange and the cam is located adjacent to the distal end of the sleeve. Rotation of the cam disk with respect to the flange to an unlocked position aligns the cam with the sleeve to facilitate insertion though the hole in the member, and rotation of the cam disk to a locked position misaligns the cam with respect to the sleeve such that the cam engages the member against removal through the hole in the member. The apparatus also includes a metal clip fixed to the cam disk that retains a lashing ring, which facilitates manual rotation of the cam disk by rotating the lashing ring. The apparatus also includes an orientation mark disposed upon the flange to indicate a preferred orientation during manual insertion of the lashing pin apparatus through the hole in the member. The apparatus also includes an engagement indicator disposed on a proximate surface of the lashing pin apparatus that is revealed while the cam disk is located at the locked position, which provides an indication that the cam is misaligned with the sleeve and retained against removal through the hole in the member. The apparatus also includes a non-engagement indicator disposed on a proximate surface of the lashing pin apparatus that is revealed while the cam disk is located at the unlocked position, which provides an indication that the cam is aligned with the sleeve and enabled for insertion or removal through the hole in the member. In addition, the apparatus further includes a first hole formed through the flange and a second hole formed through the cam disk, wherein the first hole and the second hole are aligned while the cam disk is located at the locked position, to thereby facilitate insertion of an anti-rotation member through both of the first hole and the second hole, which prevents rotation of the cam disk away from the locked position.

An illustrative embodiment of the present disclosure teaches a method of connecting a lashing pin apparatus to a member having a hole formed therethrough, wherein the lashing pin apparatus includes a cam pin sleeve with a flange at a proximal end thereof and a cam pin hole formed eccentrically therethrough from the flange to a distal end thereof, and wherein the lashing pin apparatus further includes a cam pin assembly with a cam pin fixed between a cam disk at a proximal end and a cam eccentrically connected at a distal end thereof, and wherein the cam pin rotatably engages the cam pin hole and is aligned such that the cam disk is located adjacent the flange and the cam is located adjacent to the distal end of the sleeve. The method includes the steps of rotating the cam disk with respect to the flange to an unlocked position aligning the cam with the cam sleeve, then inserting the distal end of the lashing pin apparatus through the hole in the member, and rotating the cam disk with respect to the flange to a locked position misaligning the cam with the cam sleeve, thereby engaging the cam with the member and preventing removal of the lashing pin apparatus from the hole in the member.

In a specific embodiment of the foregoing method, the lashing pin apparatus further includes a metal clip fixed to the cam disk that retains a lashing ring, and both of the rotating steps are accomplished by grasping and rotating the lashing ring.

In a specific embodiment of the foregoing method, wherein the member is supported by a fixture or a vehicle, the method includes the further steps of attaching a second lashing ring to the fixture or vehicle and connecting a lash line between the lashing ring and the second lashing ring, thereby securing the member to the fixture or vehicle.

In a specific embodiment of the foregoing method, wherein an orientation mark is disposed upon the flange to indicate a preferred orientation during manual insertion of the lashing pin apparatus through the hole in the member, and method further includes orienting the orientation mark prior to the inserting step, thereby orienting the lashing pin apparatus at the preferred orientation.

In a specific embodiment of the foregoing method, wherein the lashing pin apparatus includes an engagement indicator disposed on a proximate surface of the lashing pin apparatus that is revealed while the cam disk is located at the locked position, the method further includes rotating the cam disk to reveal the engagement indicator, thereby providing an indication that the cam is misaligned with the sleeve and retained against removal through the hole in the member.

In a specific embodiment of the foregoing method, wherein the lashing pin apparatus includes a non-engagement indicator disposed on a proximate surface of the lashing pin apparatus that is revealed while the cam disk is located at the unlocked position, the method further includes rotating the cam disk to reveal the non-engagement indicator, thereby providing an indication that the cam is aligned with the sleeve and enabling insertion or removal through the hole in the member.

In a specific embodiment of the foregoing method, wherein the lashing pin apparatus includes a first hole formed through the flange and a second hole formed through the cam disk that are located such that the first hole and the second hole are aligned while the cam disk is located at the locked position, the method further include inserting an anti-rotation member through both of the first hole and the second

BRIEF DESCRIPTION OF THE DRAWINGS

FIG. 10 is a side view drawing of a lashing pin apparatus according to an illustrative embodiment of the present invention.

FIG. 11 is a section view drawing of a cam pin sleeve and cam pin of a lashing pin apparatus according to an illustrative embodiment of the present invention.

FIG. 12 is a section view drawing of a lashing pin apparatus according to an illustrative embodiment of the present invention.

DESCRIPTION OF THE INVENTION

Figure 1:
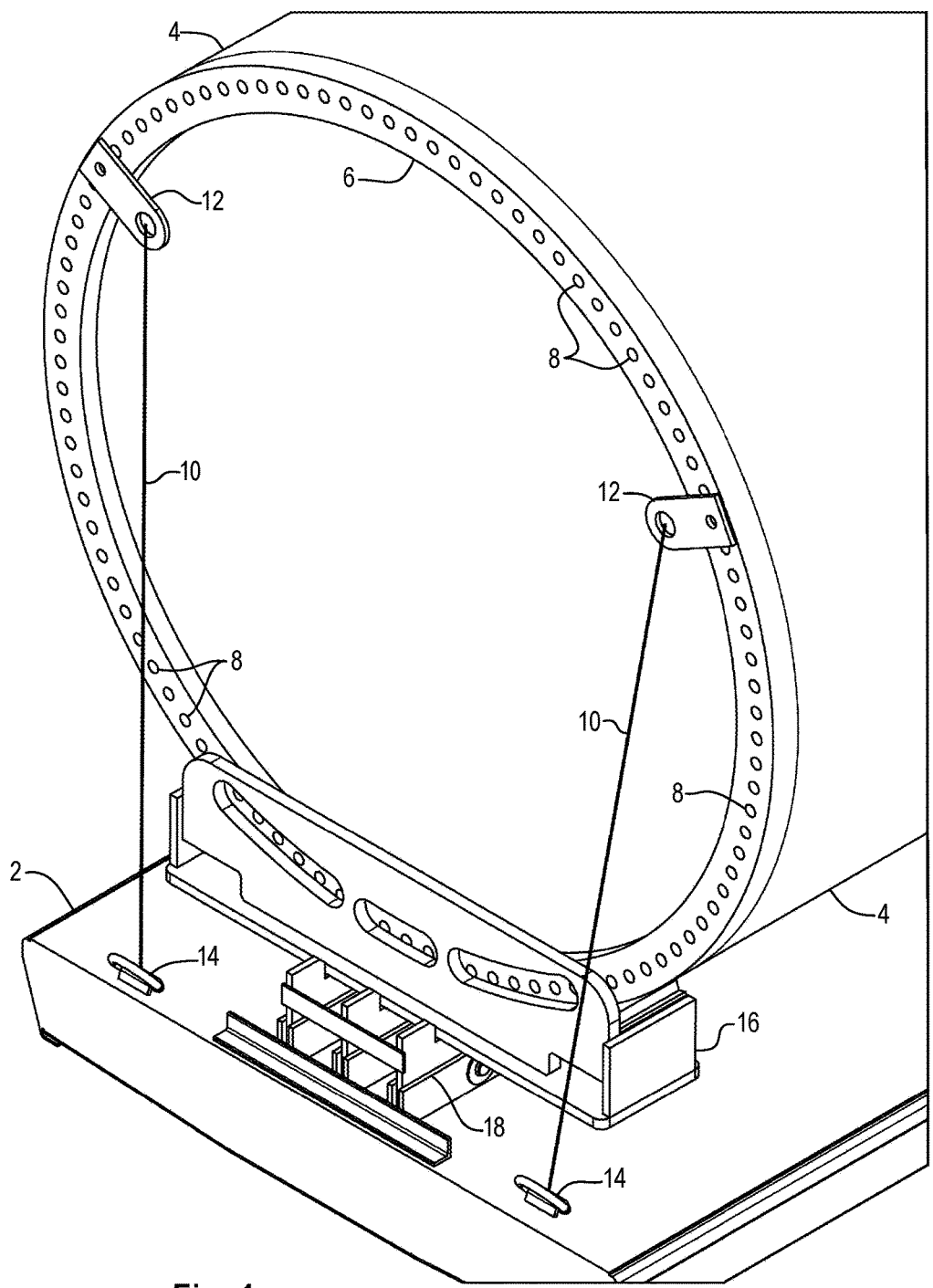
FIG. 1 is a prior art drawing of a wind turbine tower section lashed to a railroad flatcar.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The principles of the present disclosure are embodied in a novel securement lashing pin used for lashing a load to a transportation vehicle or fixture. In an illustrative embodiment, the pin is used to secure the ends of a wind turbine tower section to corresponding tie down lashing rings fixed to a railcar. The lashing pins are inserted through flange bolt holes, and secured in place by rotating a cam disk on the pin to operate a cam, which retainably engages the hole. The use of the lashing pins minimizes both the amount of time and tools required to complete the task of lashing a load. An illustrative embodiment of a tower securement pin embodying these principles is shown in the accompanying drawings. In particular, each set of a bolt, washer, and nut used in prior art securement systems is replaced by a securing pin that employs an eccentric cam. The pin is inserted through a bolt hole in a flange, and with a quick turn of the pin's cam disk, the pin's cam rotates inside the tower flange's hole securing the assembly in place. No tools are required to perform this action.

Figure 2:
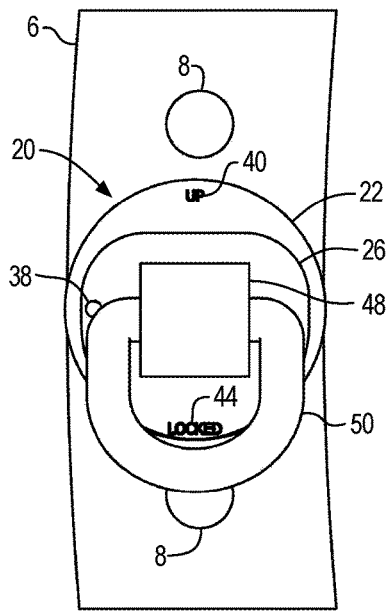
FIG. 2 is an end view drawing of a lashing pin apparatus coupled to a flange in a locked position according to an illustrative embodiment of the present invention.

Reference is directed to FIG. 2, which is an end view drawing of a lashing pin apparatus 20 coupled to a tower end flange 6, and in a locked position, according to an illustrative embodiment of the present invention. The tower section end flange 6 has plural existing bolt holes 8 formed therethrough, and the lashing pin 20 has been inserted into one of them. At the outermost, or proximal, position is a lashing ring 50, which is retained to a cam disk 26 using an angle clip 48. The lashing ring 50 is formed in the shape of the letter 'D' and rotatably engages the clip 48 such that the lashing ring 50 can swivel freely. Behind, or distal from, the cam disk 26 is a flange 22 that is positioned against the tower end flange 6. The flange 22 is inscribed with the word "UP" 40, which functions as an orientation mark so that a user inserting the lashing pin 20 into the tower end flange 6 orients the lashing pin 20 in a preferred orientation. The cam disk 26 is inscribed with the word "LOCKED" 42 on the lower portion of its proximal face. The word "LOCKED" 42 is revealed and properly oriented while the lashing pin 20 is in the locked position, and indicates to the user that the lashing pin 20 is presently locked into the tower end flange 6.

Figure 3:
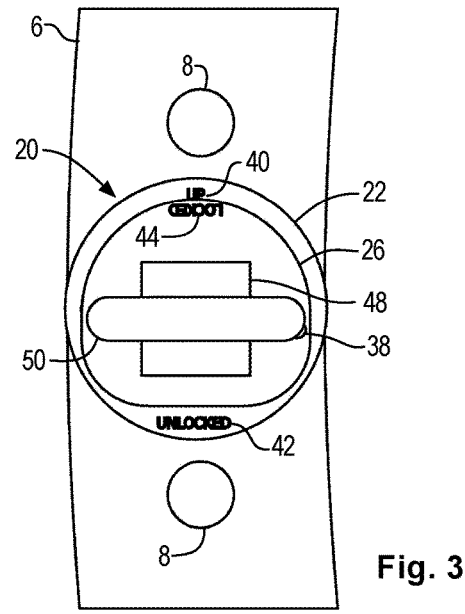
FIG. 3 is an end view drawing of a lashing pin apparatus coupled to a flange in an unlocked position according to an illustrative embodiment of the present invention.

Reference is directed to FIG. 3, which is an end view drawing of a lashing pin apparatus 20 coupled to a tower section end flange 6 in the unlocked position according to an illustrative embodiment of the present invention. The tower section end flange 6 has plural existing bolt holes 8 formed therethrough, and the lashing pin 20 has been inserted into one of them. In this view, the lashing ring 50 is viewed in a horizontal position, whereas in FIG. 2 it was in a vertical position, and movement between these two positions is made possible by the swiveling relationship provided by clip 48. In this view, the cam disk 26 has been rotated one-half turn, by grasping and turning the lashing ring 50, to the unlocked position. Note that the rotated cam disk does not conceal the orientation mark "UP" 40. Rotation of the cam disk 26 does relocated and invert the "LOCKED" engagement indicator 44, which notifies the user that the lashing pin is no longer in the locked position. Note that the flange 22 has been engraved with the word "UNLOCKED" 42, which serves as a non-engagement indicator. Since the cam disk has a varying radius, the rotation exposes a greater area of the flange underneath, which reveals the non-engagement indicator 42. A user viewing the lashing pin 20 in this orientation is thusly informed of both the proper orientation be the orientation mark 40, and also whether or not the lashing pin is locked or unlocked by virtue of the engagement 44 and non-engagement 42 indicators.

The embodiment illustrated in FIGS. 2 and 3 present one configuration of the engagement and non-engagement indicators, as well as the orientation mark. The illustrated arrangement is effective, relatively low cost to produce, and durable in field use. Other arrangements could be used to achieve the same goals. For example, the cam disk could be slotted and the engagement indicators could be place on the flange such that they appear through the slots, depending on the angular position of the cam disk. The key aspect of any arrangement is that the indicators be presented on a distal surface of the lashing pin assembly so that they are readily visible to the user.

Figure 4:
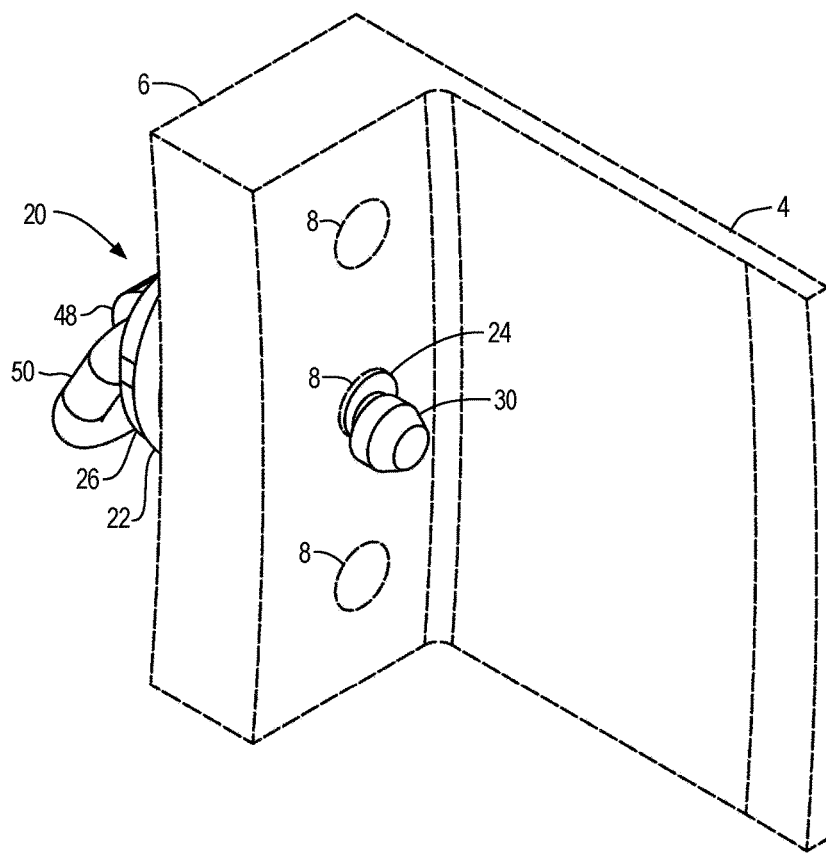
FIG. 4 is a perspective view drawing of a lashing pin apparatus coupled to a flange in a locked position according to an illustrative embodiment of the present invention.

Reference is directed to FIG. 4, which is a perspective view drawing of a lashing pin apparatus 20 coupled to a flange 6 in the locked position according to an illustrative embodiment of the present invention. This view presents a small section of the tower 4 end flange 6, which has plural bolt holes 8 formed therethrough. The lashing pin 20 has been inserted through one of the bold holes 8 and is oriented in the locked position. A portion of the lashing ring 50, clip 48, cam disk 26, and flange 22 are visible. This view illustrates the arrangement of a cam sleeve 24 and cam 30 in the locked position. The cam 30 is misaligned with the cam sleeve 24, in an eccentric manner, such that the cam 30 engages the tower end flange 6 and cannot be withdrawn through the bolt hole 8. This is the essential mechanism preventing removal of the lashing pin assembly 20, and rendering it locked into position.

Figure 5:
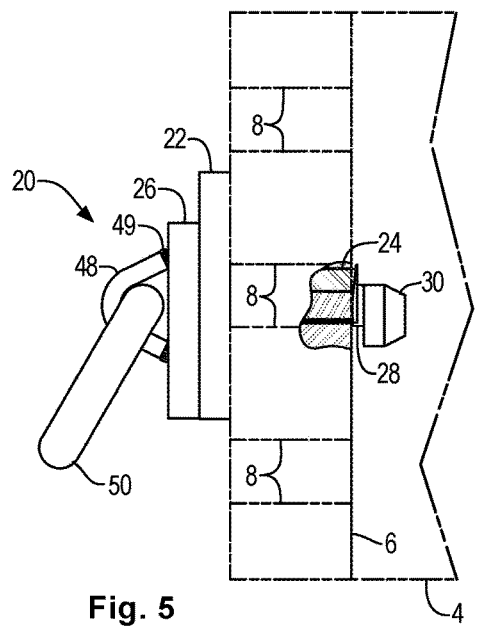
FIG. 5 is a side view drawing of a lashing pin apparatus coupled to a flange in a locked position according to an illustrative embodiment of the present invention.

Reference is directed to FIG. 5, which is a side view drawing of a lashing pin apparatus 20 coupled to a tower end flange 6 in the locked position according to an illustrative embodiment of the present invention. This view shows the lashing ring 50, the clip 48, the cam disk 26, and the flange 22 in clear relationship with one another. Note that the clip 48 is welded 49 to the proximal face of the cam disk 26. A cam pin sleeve 24 extends from the distal face of flange 22 and passes along the interior of the bolt hole 8. A cam pin 28 passes through an eccentrically located cam pin hole formed through the cam pin sleeve 24. The cam pin sleeve 24 is rigidly fixed to the flange 22. At the distal end of the cam pin 28 is an eccentrically mounted cam 30. The cam disk 26, cam pin 28, and cam 30 are rigidly connected and rotate together about the cam pin hole formed in the cam pin sleeve 24. Thusly, rotation of the cam disk 26 causes the cam 30 to rotate with respect to the cam pin sleeve 24. The eccentric relationship of the components is selected such that the cam 30 can be aligned and misaligned with the cam pin sleeve 24, to facilitate insertion through the bolt hole 8, and locking in place, as will be more fully detailed hereinafter.

Figure 6:
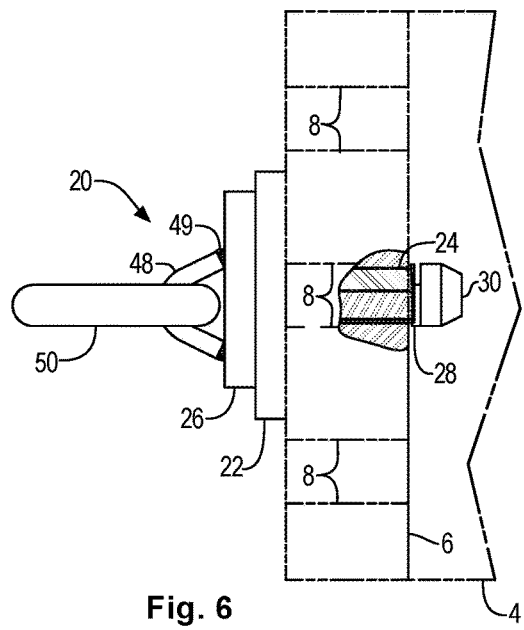
FIG. 6 is a side view drawing of a lashing pin apparatus coupled to a flange in an unlocked position according to an illustrative embodiment of the present invention.

Reference is directed to FIG. 6, which is a side view drawing of a lashing pin apparatus 20 coupled to a tower 4 end flange 6 in the unlocked position according to an illustrative embodiment of the present invention. This view corresponds with FIG. 5, however, in FIG. 6, the cam disk 26 has been rotated by one-half turn. This rotation, and the eccentric relationships discussed above, cause the cam 30 to align with the cam sleeve 24, such that the outside diameters of these two members are aligned and the lashing pin assembly 20 can be inserted through, or removed from, the bolt hole 8.

Figure 7:
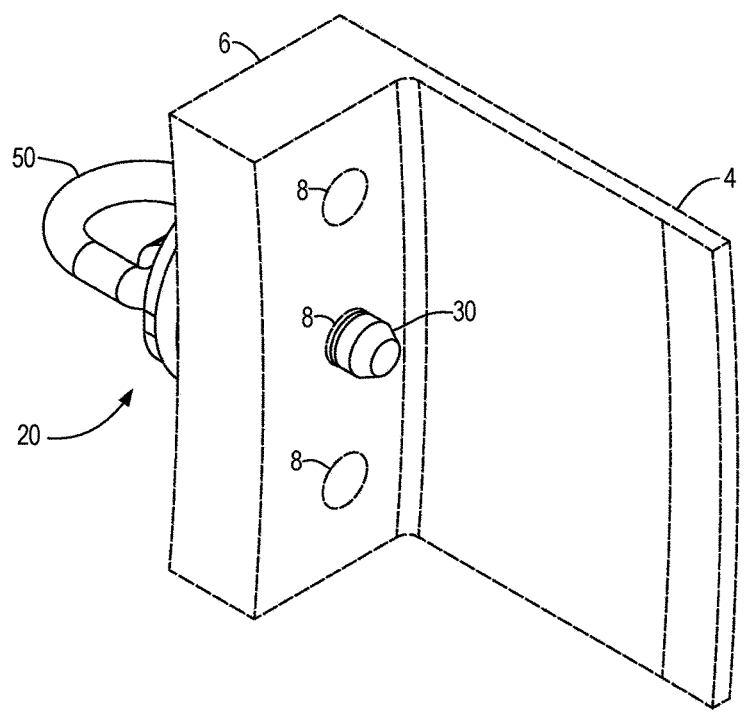
FIG. 7 is a perspective view drawing of a lashing pin apparatus coupled to a flange in an unlocked position according to an illustrative embodiment of the present invention.

Reference is directed to FIG. 7, which is a perspective view drawing of a lashing pin apparatus 20 coupled to a tower 4 end flange 6 in the unlocked position according to an illustrative embodiment of the present invention. This view presents a small section of the tower 4 end flange 6, which has plural bolt holes 8 formed therethrough. The lashing pin 20 has been inserted through one of the bold holes 8 and is oriented in the unlocked position. This view illustrates the arrangement of the cam 30 as being aligned with the bolt hole 8 such that the lashing pin assembly 20 can be inserted through, or removed from the bolt hole 8.

Figure 8:
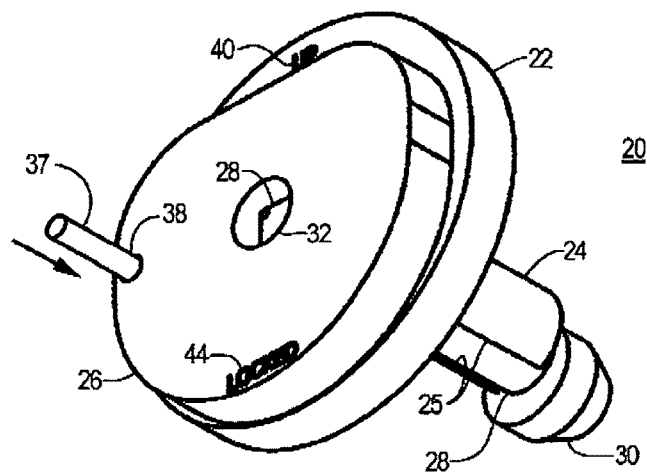
FIG. 8 is a perspective view drawing of a lashing pin apparatus according to an illustrative embodiment of the present invention.

Reference is directed to FIG. 8, which is a perspective view drawing of a lashing pin apparatus 20 according to an illustrative embodiment of the present invention. This view presents the lashing pin apparatus 20 in the locked position without the tower end flange so that the arrangement of components is clearly presented. It also presents a partial assembly, where the lashing ring and clip discussed earlier are not presented. At the proximal end of the assembly is the cam disk 26, which has the "LOCKED" engagement indicator 44 on engrave on its proximal face. A hole 32 is formed though the cam disk 26 for receiving the proximal end of the cam pin 28. During fabrication, the cam pin 28 is welded to the cam disk 26 within this hole 32. The cam disk also has hole 38 formed though it, which is used to receive an anti rotation-member, which is pin 37 in this FIG. 8, or which may be another member suitable to prevent rotation, such as a padlock, and which will be more fully discussed hereafter. The cam disk 26 is directly adjacent to the flange 22, which has the orientation indicator "UP" 40 engraved upon its face. The cam pin sleeve 24 extends from the distal face of the flange 22, and has the cam pin hole 25 formed therethrough. The cam pin hole 25 is so eccentric with respect the cam pin sleeve 24, that it presents an opening in the cam pin sleeve 24, as illustrated. The cam 30 is eccentrically fixed to the distal end of the cam pin 28, and rotates together therewith.

Figure 9:
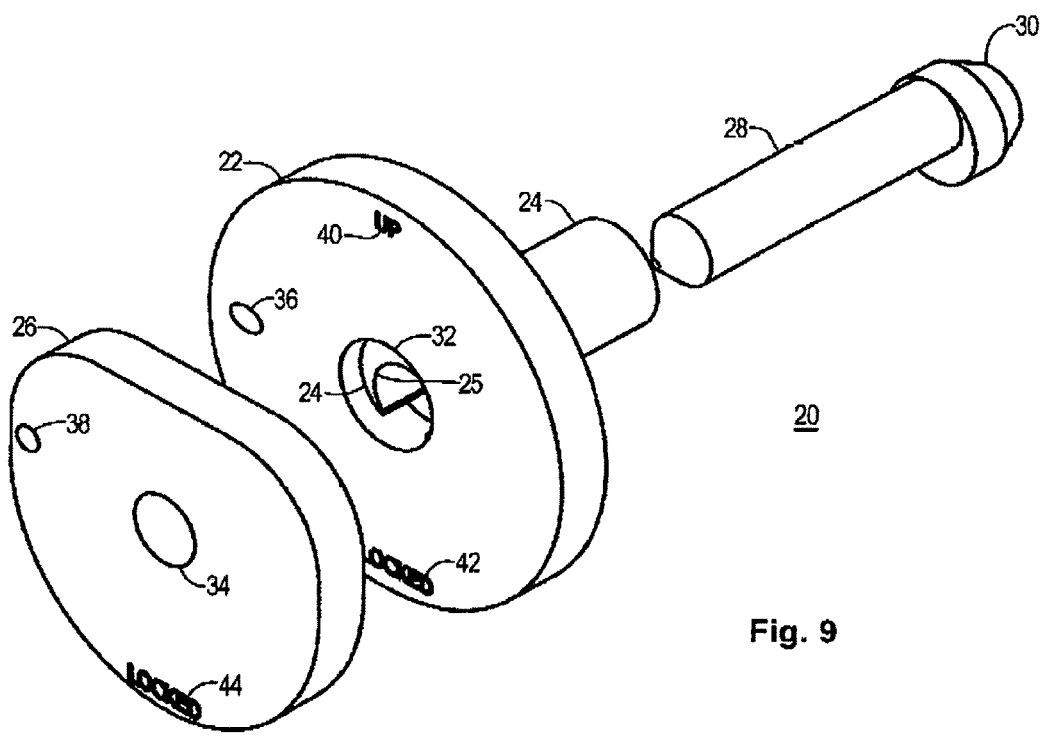
FIG. 9 is an exploded view drawing of a lashing pin apparatus according to an illustrative embodiment of the present invention.

Reference is directed to FIG. 9, which is an exploded view drawing of a lashing pin apparatus 20 according to an illustrative embodiment of the present invention. The cam disk 26 includes the "LOCKED" engagement indicator 44 on its proximal face, the cam pin attachment hole 34, and the anti-rotation member hole 38, as discussed hereinbefore. The flange 22 includes the "UP" orientation mark 40 and the "UNLOCKED" non-engagement indictor on its proximal face. A cam pin sleeve mounting hole 32 is formed in the flange 22 for receiving the cam pin sleeve 24, and these two members are welded together through this hole during assembly. The flange 22 also has a second anti-rotation device hole 36 formed through it. When the cam disk 26 and the flange 22 are aligned in the locked position, the two holes 38, 36 align such that an anti-rotation device may be inserted through them, and thereby prevent rotation. The eccentric cam pin hole 25 is formed through the cam pin sleeve 24. The cam pin sleeve 24 extends from the distal face of the flange 22, and rotatably engages the cam pin 28. The cam pin 28 has the cam 30 eccentrically connected at its distal end, as illustrated.

Reference is directed to FIG. 10, which is a side view drawing of a lashing pin apparatus 20 according to an illustrative embodiment of the present invention. This view presents the apparatus in the locked position, with the section view references. The cam disk 26, flange 22, cam pin sleeve 24, cam pin hole 25, cam pin 28, and cam 30 are all presented. Note the alignment of the first 38 and second 36 anti-rotation member holes while in the locked position.

Reference is directed to FIG. 11, which is a section view A-A drawing of a cam pin sleeve 24 and cam pin 28 of a lashing pin apparatus according to an illustrative embodiment of the present invention. The cam pin hole 25 is so eccentric that it presents and opening 27 along the bottom of the cam pin sleeve 28.

Reference is directed to FIG. 12, which is a section view B-B drawing of a lashing pin apparatus according to an illustrative embodiment of the present invention. In this view, note that the cam pin 28 is welded 29 to the cam disk 26 within the cam pin hole 34. Also note that the cam pin sleeve 24 is welded 23 to the flange 22 within the cam pin sleeve hole 32.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A lashing pin apparatus for retainably engaging a hole formed through a member, comprising:
    a cam pin sleeve having a flange at a proximal end thereof, and having a cam pin hole formed eccentrically therethrough from said flange to a distal end thereof;
    a cam pin assembly having a cam pin fixed between a cam disk at a proximal end and a cam eccentrically connected at a distal end thereof, and wherein
    said cam pin rotatably engages said cam pin hole and is aligned such that said cam disk is located adjacent said flange and said cam is located adjacent to said distal end of said sleeve;
    a lashing ring connected to said cam disk to facilitate manual rotation of said cam disk;
    a metal clip fixed to said cam disk through which said lashing ring swivels, and wherein
    rotation of said cam disk with respect to said flange to an unlocked position aligns said cam with said sleeve to facilitate insertion though the hole in the member, and rotation of said cam disk to a locked position misaligns said cam with respect to said sleeve such that said cam engages the member against removal through the hole in the member.

2. The apparatus of claim 1, further comprising:
an orientation mark disposed upon said flange to indicate a preferred orientation during manual insertion of the lashing pin apparatus through the hole in the member.

3. The apparatus of claim 1, further comprising:
an engagement indicator disposed on a proximate surface of the lashing pin apparatus that is revealed while said cam disk is located at said locked position, to thereby provide an indication that said cam is misaligned with said sleeve and retained against removal through the hole in the member.

4. The apparatus of claim 1, further comprising:
an non-engagement indicator disposed on a proximate surface of the lashing pin apparatus that is revealed while said cam disk is located at said unlocked position, to thereby provide an indication that said cam is aligned with said sleeve and enabled for insertion or removal through the hole in the member.

5. The apparatus of claim 1, further comprising:
a first hole formed through said flange;
a second hole formed through said cam disk, and wherein said first hole and said second hole are aligned while said cam disk is located at said locked position, to thereby facilitate insertion of an anti-rotation member through both of said first hole and said second hole, and to thereby prevent rotation of said cam disk away from said locked position.

6. A lashing pin apparatus for retainably engaging a hole formed through a member, comprising:
a cam pin sleeve having a flange at a proximal end thereof, and having a cam pin hole formed eccentrically therethrough from said flange to a distal end thereof;
a cam pin assembly having a cam pin fixed between a cam disk at a proximal end and a cam eccentrically connected at a distal end thereof, and wherein
said cam pin rotatably engages said cam pin hole and is aligned such that said cam disk is located adjacent said flange and said cam is located adjacent to said distal end of said sleeve, and wherein
rotation of said cam disk with respect to said flange to an unlocked position aligns said cam with said sleeve to facilitate insertion though the hole in the member, and rotation of said cam disk to a locked position misaligns said cam with respect to said sleeve such that said cam engages the member against removal through the hole in the member;
a metal clip fixed to said cam disk that retains a lashing ring, to facilitate manual rotation of said cam disk by rotating said lashing ring;
an orientation mark disposed upon said flange to indicate a preferred orientation during manual insertion of the lashing pin apparatus through the hole in the member;
an engagement indicator disposed on a proximate surface of the lashing pin apparatus that is revealed while said cam disk is located at said locked position, to thereby provide an indication that said cam is misaligned with said sleeve and retained against removal through the hole in the member;
a non-engagement indicator disposed on a proximate surface of the lashing pin apparatus that is revealed while said cam disk is located at said unlocked position, to thereby provide an indication that said cam is aligned with said sleeve and enabled for insertion or removal through the hole in the member;

a first hole formed through said flange;
a second hole formed through said cam disk, and wherein said first hole and said second hole are aligned while said cam disk is located at said locked position, to thereby facilitate insertion of an anti-rotation member through both of said first hole and said second hole, and to thereby prevent rotation of said cam disk away from said locked position.

7. A method of connecting a lashing pin apparatus to a member having a hole formed therethrough, wherein the lashing pin apparatus includes a cam pin sleeve having a flange at a proximal end thereof and a cam pin hole formed eccentrically therethrough from the flange to a distal end thereof, and wherein the lashing pin apparatus further includes a cam pin assembly having a cam pin fixed between a cam disk at a proximal end and a cam eccentrically connected at a distal end thereof, and wherein the cam pin rotatably engages the cam pin hole and is aligned such that the cam disk is located adjacent the flange and the cam is located adjacent to the distal end of said sleeve, the method comprising the steps of:
rotating the cam disk with respect to the flange to an unlocked position aligning the cam with the cam sleeve;
inserting the distal end of the lashing pin apparatus through the hole in the member, and rotating the cam disk with respect to the flange to a locked position misaligning the cam with the cam sleeve, thereby engaging the cam with the member and thereby preventing removal of the lashing pin apparatus from the hole in the member, and wherein
the lashing pin apparatus further includes a metal clip fixed to the cam disk that retains a lashing ring, and wherein both of said rotating steps are accomplished by grasping and rotating the lashing ring.

8. The method of claim 7, and wherein the member is supported by a fixture or a vehicle, and further comprising the steps of:
attaching a second lashing ring to the fixture or vehicle;
connecting a lash line between the lashing ring and the second lashing ring, thereby securing the member to the fixture or vehicle.

9. The method of claim 7, and wherein an orientation mark is disposed upon the flange to indicate a preferred orientation during manual insertion of the lashing pin apparatus through the hole in the member, and further comprising the step of:
orienting the orientation mark prior to said inserting step, thereby orienting the lashing pin apparatus at the preferred orientation.

10. The method of claim 7, wherein the lashing pin apparatus includes an engagement indicator disposed on a proximate surface of the lashing pin apparatus that is revealed while the cam disk is located at the locked position, and further comprising the steps of:
rotating the cam disk to reveal the engagement indicator, thereby providing an indication that the cam is misaligned with the sleeve and retained against removal through the hole in the member.

11. The method of claim 7, wherein the lashing pin apparatus includes a non-engagement indicator disposed on a proximate surface of the lashing pin apparatus that is revealed while the cam disk is located at the unlocked position, and further comprising the steps of:
rotating the cam disk to reveal non-engagement indicator, thereby providing an indication that the cam is aligned with the sleeve and enabling insertion or removal through the hole in the member.

12. The method of claim 7, wherein the lashing pin apparatus includes a first hole formed through the flange and a second hole formed through the cam disk that are located such that the first hole and the second hole are aligned while the cam disk is located at the locked position, and further comprising the steps of:

inserting an anti-rotation member through both of the first hole and the second hole, thereby preventing rotation of the cam disk away from the locked position.

* * * * *